US005153042A

United States Patent [19]

Indrelie

[11] Patent Number: 5,153,042

[45] Date of Patent: Oct. 6, 1992

[54] TAMPER-INDICATING LABELSTOCK

[75] Inventor: Kenneth W. Indrelie, St. Paul, Minn.

[73] Assignee: Minnesota Mining and Manufacturing Company, St. Paul, Minn.

[21] Appl. No.: 352,353

[22] Filed: May 16, 1989

[51] Int. Cl.[5] .......... B32B 7/06; G09F 3/03

[52] U.S. Cl. .......... 428/40; 40/299; 283/72; 283/81; 428/916

[58] Field of Search .......... 428/40, 916; 40/299; 283/72, 81

[56] References Cited

U.S. PATENT DOCUMENTS

| | | | |
|---|---|---|---|
| Re. 24,906 | 12/1960 | Ulrich | 428/480 X |
| 3,623,944 | 11/1971 | Davis | 428/515 X |
| 3,631,617 | 1/1972 | Pekko | 283/81 X |
| 3,864,855 | 2/1975 | Pekko | 428/916 X |
| 3,896,965 | 7/1975 | Cornell | 428/916 X |
| 4,121,003 | 10/1978 | Williams | 428/40 |
| 4,184,701 | 1/1980 | Franklin et al. | 428/916 X |
| 4,250,209 | 2/1981 | de Leeuw et al. | 427/250 |
| 4,454,956 | 6/1984 | Patterson | 220/214 |
| 4,557,505 | 12/1985 | Schaefer | 428/40 X |
| 4,588,465 | 5/1986 | Paciorek | 156/220 |
| 4,608,288 | 8/1986 | Spindler | 428/78 |
| 4,652,473 | 3/1987 | Han | 428/40 X |
| 4,684,554 | 8/1987 | Ou-Yang | 428/34.2 |
| 4,719,740 | 1/1988 | Gach | 53/421 |
| 4,746,556 | 5/1988 | Matsuguchi et al. | 428/40 |
| 4,763,931 | 8/1988 | Matsuguchi et al. | 428/916 X |
| 4,772,650 | 9/1988 | Ou-Yang | 524/271 |
| 4,825,801 | 5/1989 | Weber | 116/201 |

FOREIGN PATENT DOCUMENTS 2136352 9/1984 United Kingdom .

OTHER PUBLICATIONS

"Scotch TM Protective Graphic Systems" brochure of 3M Company, St. Paul, Minn. #70-0701-7040-5(126.5) RI CSD 168A.

"Tampermark TM" MM 150 labelstock, Flexcon Co., Inc., Spencer, Mass.

*Primary Examiner*—Henry F. Epstein

*Attorney, Agent, or Firm*—Gary L. Griswold; Walter N. Kirn; James V. Lilly

[57] ABSTRACT

A labelstock, which after being carefully removed cannot be re-applied without leaving an unmistakable warning of tampering. If comprises a transparent facestock, a release coating forming an indicia attached to the facestock, a primer covering the facestock and release coating, a frangible metal layer covering the primer and an adhesive covering the metal layer.

11 Claims, 1 Drawing Sheet

TAMPER-INDICATING LABELSTOCK

This invention concerns adhesive labelstock that displays a warning when the labelstock has been removed or otherwise subjected to tampering.

There has long been a need for visual evidence that a container of ingestible products such as drugs has been opened. Years ago, it was considered to be sufficient to seal the container closure with an adhesive label, the backing of which was so flimsy that it would disintegrate if someone tried to remove it. However, a deft person can often remove such labels without damage by first either heating the adhesive above its softening point or by chilling the adhesive with a refrigerant such as "Freon" to make it brittle. Even if the label was slightly damaged, a prospective purchaser might fail to inspect the label with sufficient care to detect the damage or upon inspection of the label, not appreciate the significance of the damage.

There has long been a similar need to apply serial numbers or price tags to articles such as automobiles, passports, and items for sale so that they cannot be surreptitiously transferred to a different article.

These needs have been answered in large measure by the Scotch TM Protected Graphics System that has been marketed for about 12 years by 3M Company. A label of that system can bear a message (such as a repeating pattern of the word "void") that becomes visible if the label is removed (Brochure entitled "Scotch TM Protected Graphics Systems" of 3M Company, St. Paul, Minn., numbered "70-0701-7040-5(126.5)R1 CSD 168A"). As explained in the brochure (I.B. on page 5), this is accomplished by the steps of:

a) print onto one surface of flexible label facestock (e.g., a polyester film) a release coating (Scotch TM Y110 or Y112 release solution) in a pattern of an invisible warning message, b) coat a transparent primer varnish (Scotch TM Y120 primer solution) over the message, c) print visible graphics over the primer, d) print background color over the graphics such as Gotham Gothalin inks or Surflex-Lam inks, and e) laminate an adhesive layer to the background color of the resulting labelstock, e.g., by pressing the background color against the adhesive layer of an aggressive pressure-sensitive adhesive transfer tape.

A length of the adhesive-bearing labelstock can be adhered by its adhesive layer to an article to be protected, e.g., across the closure of a container. The visible graphics applied in step c) can be read through the facestock and stand out in contrast to the underlying background color and may advise an observer that the label is valid so long as the hidden message does not appear.

Materials used in the Scotch TM Protected Graphics Systems are chosen so that the force required to rupture the bond between primer and the facestock is greater than either the cohesive strengths of other elements of the labelstock or the force required to rupture the bond between the adhesive layer and any substrate to which it may be applied. On the other hand, the bond between the release coating and facestock or the cohesive strength of the release coating should be relatively weak so that any force applied to the labelstock causes either of these to fail first.

Hence, if a surreptitious attempt was made to remove the label from an article to which it had been adhered and then either reapply or transfer the label, the release coating (because of its low adhesion to the facestock) inevitably would separate from the facestock to remain on the article while that portion of the primer not covering the message would remain strongly adhered to the facestock. By thus breaking at the edges of the invisible warning message, the message becomes visible and gives any prospective purchaser an unmistakable warning.

Even so, a nagging concern remains that a person might be able to reassemble the label by adhering the facestock (and its negative of the message) in precise registration with the message remaining on the article to which the labelstock had been applied. Although it is believed that doing so would be discernible under careful examination, an ordinary person may not make such an examination.

3M Company also markets "SecurMark TM" labelstock which is a product of the above-outlined method except omitting step c). The "SecurMark TM" labelstock is sold to companies that prefer not to assemble the label. These companies print graphics only on the exterior surface of the facestock of completed labelstock. Unfortunately, the "SecurMark TM" labelstock may be less secure than the Scotch TM Protected Graphics System. After the facestock has been carefully removed to expose the hidden warning, it can be possible to cover the warning message with ink of the same color as that of step d) and then to re-adhere the facestock. The external graphics have their original appearance, so that an ordinary person might fail to notice the subterfuge.

Labelstock similar to the "SecurMark TM" labelstock is described in U.S. Pat. No. 4,746,556 (Matsuguchi et al.) except omitting the primer layer and employing an evaporated metal instead of printing as a background color. While the Matsuguchi patent is difficult to understand, it appears to say that such a label solves two problems. First, that portion of the evaporated metal which is supposed to leave a message on an article to be protected might instead be pulled off with the labelstock (sentence bridging columns 1 and 2). Second, the tackiness of the pressure-sensitive adhesive exposed by removal of all or part of the metal layer creates a sanitary problem. Matsuguchi's answer (FIG. 1) to these problems employs two release coatings (a continuous first "peel-off" layer 22 and a discontinuous second "peel-off" layer 18 that can form a message such as "Already open"). After applying a breakable layer 20 (e.g., metal by evaporation) over the first "peel-off" layer, the second discontinuous "peel-off" layer is applied over the breakable layer and over this is applied a covering layer 16 (e.g., a urethane resin). Over the covering layer is applied a sticky (pressure-sensitive) adhesive layer 14 that is protected by a release sheet 12.

The labelstock described in Matsuguchi relies on a delicate balance of adhesive forces, particularly between the first and second peel-off layers, in order to destruct in a predictable pattern. It is believed that in practice this delicate balance would be difficult to control, and the labelstock would not cleanly destruct. Furthermore, the labelstock would be difficult and expensive to produce.

Tamper-indicating labelstock marketed as "Tampermark TM" MM 150 by Flexcon Co., Inc., Spencer, Mass., has a facestock of a flexible, transparent, plastic film, on the underside of which is a thin reflective metallic layer. Covering the underside of the metallic layer is a layer of pressure-sensitive adhesive. A customer can print graphics on the exposed surface of the facestock. After adhering the "Tampermark TM " labelstock to an article, its removal results in breakage of the metallic layer to leave a message such as a repeating pattern of the word "void" on the article. When the "Tampermark TM " labelstock is peeled from an article at room temperature, the metallic layer does not break cleanly at the edges of the message. Hence, it is believed that a person could remove it with its entire metallic layer undisturbed. If so, it could be re-applied without leaving any noticeable indication of the deception. Furthermore, the "Tampermark TM " labelstock as marketed has visible ghost images at the edges of its warning message. Thus it not only enables a person to see what must be done to tamper with and reapply it, but possibly leads an ordinary person to believe that tampering had already occured even though the protected substrate had been untouched.

This invention provides the first relatively simple, labelstock or label that does not provide any indication of the warning message until it is tampered with and, after being carefully removed, cannot be re-applied without leaving a warning of tampering that would be unmistakable to an ordinary person. The novel labelstock comprises:

a) a transparent facestock, b) a transparent release coating attached to a portion of one surface of the facestock for providing an indicia, c) a transparent primer attached to said surface of the facestock and said release coating forming a relatively continuous planar surface on said surface of the facestock, d) a relatively planar frangible, visible, metal layer attached to said primer layer, and e) an adhesive layer attached to said metal layer; wherein said indicia is not visible until becoming permanently visible when said facestock is separated from said release coating.

The labelstock of the invention is unique in that instead of ink, layer d) is a frangible metal which is less than 100 nm in thickness. Hence, the labelstock and its metal layer break as easily as does the labelstock of the Scotch TM Protected Graphics System. That breakage sharply reveals the hidden indicia when the facestock is removed from a substrate to which the labelstock has been adhered. Not only does the residue of the metal layer on the substrate reveal the indicia, but that residue tends to have a grainy appearance of reduced reflectivity, due to its highly frangible nature. Hence, even if the facestock (and its negative of the message) were readhered in precise registration with the message remaining on the substrate, that graininess would make the indicia visible, even at a casual glance. Furthermore, breaks in the metal layer at the margins of the indicia would catch light to enhance its visibility.

In contrast to the possibility of masking the warning message of "SecurMark TM " labelstock that does not have internal graphics (as pointed out above), no such subterfuge should be possible with labelstock of the present invention, because a paint or masking material could not be applied over the indicia to look like a metallic film.

The transparent facestock can be any polymeric film that is sufficiently strong and durable to remain substantially unmarred while keeping protected containers closed while they are being handled in distribution. It also should be sufficiently flexible to allow application over discontinuities of the closures of ordinary containers. The facestock is transparent which means it does not mask the metal layer. Thus it can be translucent or colored to an extent not masking the metal layer. A preferred facestock is biaxially oriented polyethyleneterephthalate film, because it is tough, durable, moisture-resistant, dimensionally stable, and has good transparency. Other useful facestock materials include polystyrene, polyvinyl chloride, cellulose acetate, and polycarbonate.

The release coating may be any transparent material that provides a weak bond to the facestock and should be as thin as possible while still serving that function, e.g., normally from 100 to 300 nm in thickness. Preferred release coatings include polyvinyl alcohol, silicones, fluorinated chemicals, and waxes. Especially preferred are Scotch TM Y-110 and Y-112 release solutions which are polyvinyl alcohol dissolved in isopropyl alcohol and deionized water.

The transparent primer should be selected to form strong bonds both to the facestock and to the frangible metal layer. A preferred primer is the Scotch TM Y-120 primer solution which is described in detail hereinafter. Another preferred primer is Surflex-Lam Varnish from Del-Val Ink and Color Co. of Riverton, N.J. The thickness of the primer should be sufficient to afford a continuous, planar surface to which the frangible metal layer can be applied, thus ensuring against visible ghost images at the edges of the indicia. To do so, its thickness preferably is about 4 to 6 times the thickness of the release coating. The metal layer should be clearly visible through the primer, facestock and release coating.

Preferred for making the metal layer is aluminum, because it can be inexpensively applied and remains brilliantly reflective for years, being protected from oxygen by other elements of the novel labelstock. Other useful metals include zinc, silver, gold, and copper. It is preferred that the frangible metal layer be highly reflective.

The frangible, metal layer can be vapor deposited by conventional techniques such as a bell-jar technique or a semi-continuous process. Its thickness preferably is great enough to limit its transmission of visible light to not more than 2%, more preferably to less than 1%. When the metal layer is aluminum, its thickness preferably is from 10 to 25 nm, which range provides from about 0.1 to 0.5% transmission of light and an electrical resistance range of about 1 to 2 ohms/sq.

In making labelstock of the invention, visible graphics can be printed over the primer in the same manner as in the Scotch TM Protected Graphics System as long as doing so does not mask the edges of the frangible, metal layer when it breaks to outline the indicia and does not provide a surface that causes ghosting of the indicia. With the same caution, the novel labelstock can instead or also be imprinted with graphics on the exposed surface of its facestock.

The adhesive layer of the novel labelstock should be one that forms strong bonds both to the frangible, highly reflective metal layer and to any substrate to be protected. For convenience of use, the adhesive layer of the novel labelstock may be an aggressive pressure-sensitive adhesive, preferably one of the high-strength acrylic pressure-sensitive adhesives recommended in the above-cited "Scotch TM Protected Graphics Systems" brochure, all of which form strong bonds both to metals and to many materials that are used to package drugs, other ingestibles, or articles such as automobile parts and passports to which price or other registration information must be applied. Particularly preferred pressure-sensitive adhesives include copolymers of alkyl acrylates which have a straight chain of from 4 to 12 carbon atoms and a minor proportion of a highly polar copolymerizable monomer such as acrylic acid such as those in Ulrich U.S. Pat. No. Re: 24,906 and U.S. Pat. No. 2,973,286. A preferred adhesive is a copolymer of isooctylacrylate and acrylic acid described hereinafter.

BRIEF DESCRIPTION OF THE DRAWINGS

The invention may be more easily understood in reference to the drawing, all figures of which are schematic. In the drawing:

In FIG. 1, a label stock 10 includes a flexible, transparent, polyester film 11 that has been imprinted with a release coating 12 in an invisible repeating pattern of words. Covering the imprinting is a transparent primer coating 14 which in turn is covered by a vapor-deposited layer of metal 16. Laminated to the metal is a pressure-sensitive adhesive layer 18 on a removable liner 20. In FIG. 2, the liner 20 has been stripped off to permit the labelstock 10 to be adhered by its pressure-sensitive adhesive layer 18 to a substrate 22, and the facestock 11 has been peeled from the substrate. Upon doing so, the labelstock has fractured at its weakest points, viz., between the release coating 12 and the facestock 11 as shown in FIG. 2. Hence, the invisible words of the release coating have been made visible by portions of the metal layer 16 that remain on the substrate 22, and metal remaining on the facestock 11 which shows areas between the words.

Figure 1:
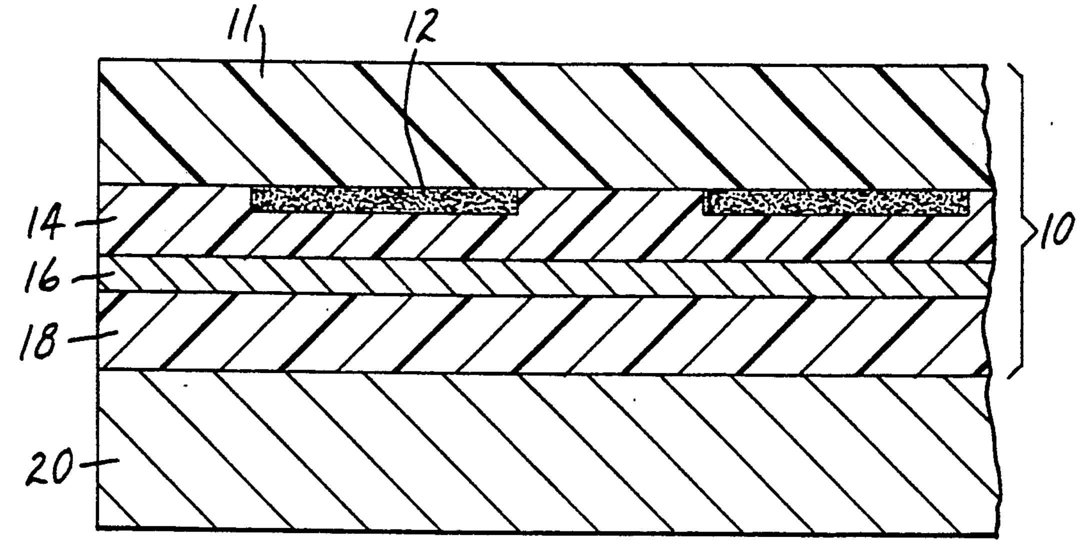
FIG. 1 is a cross section through a preferred labelstock of the invention.
Figure 2:
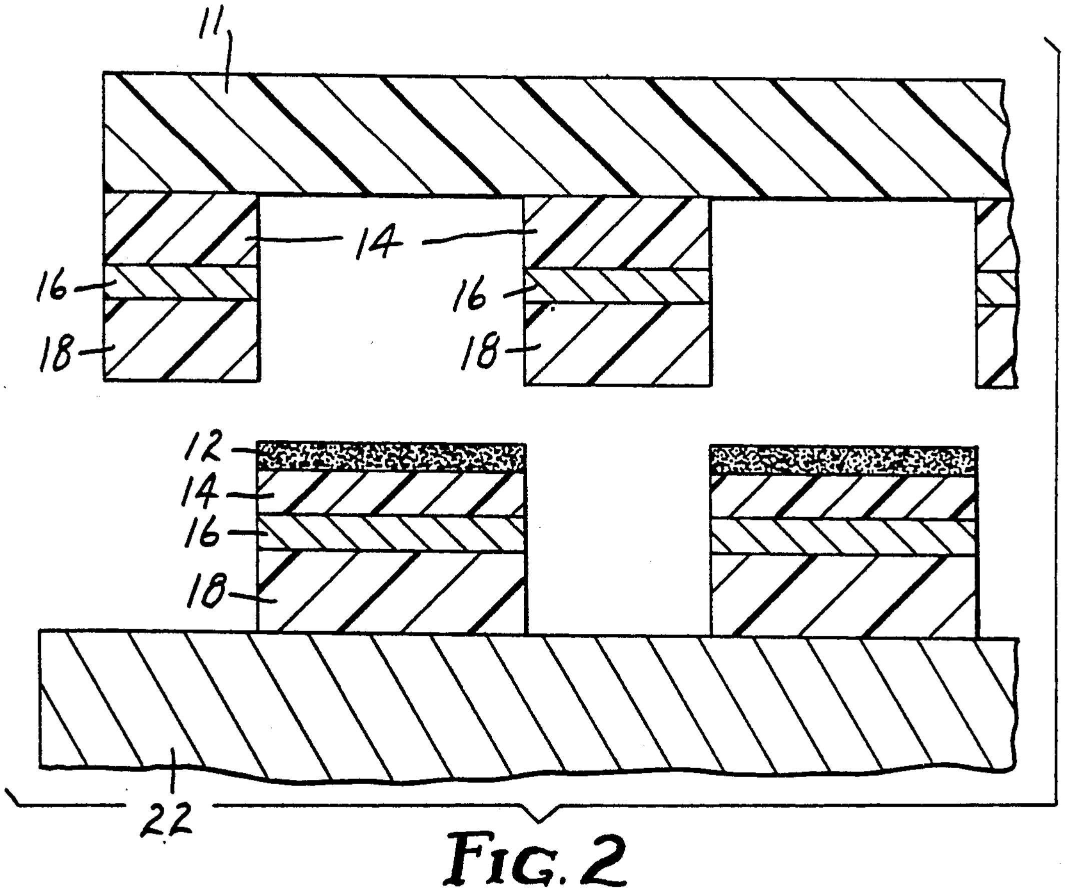
FIG. 2 is a cross section through the label stock of FIG. 1 that had been adhered to a substrate, showing the manner in which it would fail upon any attempt at tampering.

The following example is meant to illustrate but not to limit the invention. All parts and percentages are by weight unless otherwise specified.

EXAMPLE

A labelstock of the invention was made using as a facestock a transparent film of biaxially oriented polyethylene terephthalate (Mylar-D TM film from E. I. DuPont de Nemours & Company, Wilmington, Del.) which is 2 mil (50 microns) thick and 50 inches (127 centimeters) wide. Onto one of the surfaces of the facestock was flexigraphically printed a release solution comprising polyvinyl alcohol dissolved in isopropyl alcohol and deionized water (Scotch TM Y-110 release solution, 3M Company, St. Paul, Minn.). The Y-110 solution had been thinned with a 75/25 parts by volume water/isopropyl alcohol solution to a #2 Zahn-cup viscosity of between 20–25 seconds at 32° C. The release coating after drying was about 200 nm in thickness and produced a repeating pattern of the word "VOID" as an indicia about 0.5 cm in height. The release-coated facestock surface was then flood coated with a transparent primer varnish of Vitel PE-200® polyester (E. I. DuPont de Nemours & Company, Wilmington, Del.) dissolved in ethyl acetate, n-propyl acetate, perchloroethylene and propylene glycol monomethyl ether acetate (Scotch TM Y-120 primer solution, 3M Company, St. Paul, Minn.).

Printing and coating was performed on a six color, central impression cylinder press made by Paper Converting Machine Company, Green Bay, Wis., containing six printing stations. Between each printing station were jet dryers. An additional 20 feet (6.1 m) of oven-controlled drying was present after the last of the printing stations. The release solution was applied to the web at the first station. Two print stations later the primer was applied. All dryers on the press were set at 275° (128° C.). The line was run at 300 feet (91 m) per minute. After drying, the coated facestock was rolled up into jumbo form for use in vapor coating. The dried primer formed a relatively planar surface across the coated surface of the facestock covering the exposed surfaces of the facestock and release coating. It was 900 nm thick relative to the facestock and about 700 nm thick where it covered the release coating.

The jumbo was placed into the non-heated chamber of a vapor coater containing a heated chamber and a non-heated chamber. Aluminum bars were placed in the heated chamber and heated to 2300° F. (1200° C.). This chamber was pumped down to a pressure below 0.0005 torr and aluminum vapor was created. The facestock was then passed between nip rolls and through the heated chamber, and aluminum was condensed on the coated surface of the facestock. The line speed was about 200 feet (61 m) per minute. Aluminum was coated over the entire primed surface and formed a relatively planar surface. The aluminum layer was between 10 and 25 nm in thickness and was measured in terms of electrical resistance which was converted to light transmission at between 0.13 and 0.5 percent.

The vapor-coated aluminum surface was then laminated with an acrylic pressure-sensitive adhesive layer. The pressure-sensitive adhesive was a 94.5/5.5 percent isooctylacrylate/acrylic acid adhesive as described in Ulrich U.S. Pat. No. Re: 24,906 and U.S. Pat. No. 2,973,286 which was tackified with 65 parts Foral-85, tackifying resin in flake form (Hercules, Inc., Wilmington, Del.). The adhesive had been previously bonded to a 50 lb. (22.7 Kg), bleached densified Kraft paper with a silicone release surface on the side which was attached to the adhesive. The adhesive layer had a thickness of about 25 microns. This labelstock containing a liner was then wound up. The word "VOID" was not apparent to the observer of the surface of the labelstock.

For testing, the Kraft paper was removed, and the labelstock was adhered by its acrylic pressure-sensitive adhesive layer to a transparent polyester film substrate. A 2-Kg hard rubber roll was passed once in each direction across the labelstock. After dwelling for one day, an attempt was made to peel the labelstock from the polyester film substrate. Upon doing so, the release layer became detached from the facestock, and the metal layer fractured at the borders of the release layer to provide a pattern of the word "VOID" on the polyester film substrate while the negative of the message remained on the facestock. Each of the letters of the message was sharply defined, but had a grainy appearance. Thereafter the same testing was repeated using a variety of substrates including stainless steel, aluminum, polymethylmethacrylate, polyethylene, glass and wood. In every case, the result was the same.

When these experiments were repeated in coldroom at −40° C. (after an overnight dwell), the result was similar except that the lower surface energy materials such as polypropylene did not image as sharply as the higher-surface energy material such as stainless steel.

What is claimed is:

1. Labelstock comprising a) a transparent facestock, b) a transparent release coating attached to a portion of one surface of the facestock for providing an indicia, c) a transparent primer attached to said surface of the facestock and said release coating forming a relatively continuous planar surface on said surface of the facestock, d) a relatively planar, frangible, visible metal layer attached to said primer layer, and e) an adhesive layer attached to said metal layer; wherein said indicia is not visible until becoming permanently visible when said facestock is separated from said release coating.

2. The labelstock of claim 1 wherein the release coating is from 100 to 300 nm in thickness.

3. The labelstock of claim 2 wherein the thickness of the primer is from 4 to 6 times that of the release coating.

4. The labelstock of claim 1 wherein the release coating comprises polyvinyl alcohol.

5. The labelstock of claim 1 wherein said metal layer has been applied by vapor deposition.

6. The labelstock of claim 5 wherein said metal layer is from 10 to 25 nm in thickness.

7. The labelstock of claim 6 wherein said metal layer is aluminum.

8. The labelstock as defined in claim 1 wherein a removable release liner is attached to said adhesive layer.

9. Labelstock comprising a) a transparent facestock having a first major surface free from any printed material and a second major surface parallel to said first major surface, b) a transparent release coating on said second major surface in the form of an intermittent layer so as to provide indicia thereon, c) a transparent primer over both said intermittent layer of said release coating and said second major surface, d) a frangible, visible metal layer over said primer layer, and e) an adhesive layer over said metal layer; wherein said indicia are not visible until said facestock is separated from said release coating whereupon said indicia become permanently visible.

10. Labelstock according to claim 9 wherein the adhesion of said release coating to said second major surface is less than the adhesion of said release coating to said primer layer.

11. Labelstock comprising a multiple layer construction free from external warning graphics comprising, in order, the following:

a) a transparent polymeric film, b) a transparent release coating in a pattern on said polymeric film applied so as to provide a hidden message to said labelstock, c) a continuous layer of a primer over said release coating and said polymeric film, d) a frangible metal layer over said layer of primer, and e) a layer of adhesive over said frangible metal layer; wherein said hidden message becomes permanently visible when said polymeric film is separated from said transparent release coating.

* * * * *